US007312549B2

(12) United States Patent
Rasmussen (10) Patent No.: US 7,312,549 B2
(45) Date of Patent: Dec. 25, 2007

(54) TRANSVERSE FLUX MACHINE WITH STATOR MADE OF E-SHAPED LAMINATES

(75) Inventor: Peter Omand Rasmussen, Nørresundby (DK)

(73) Assignee: Aalborg Universitet, Aalborg O (DK)

( * ) Notice: Subject to any disclaimer, the term of this patent is extended or adjusted under 35 U.S.C. 154(b) by 0 days.

(21) Appl. No.: 10/477,129

(22) PCT Filed: May 8, 2002

(86) PCT No.: PCT/DK02/00300

§ 371 (c)(1),
(2), (4) Date: Apr. 8, 2004

(87) PCT Pub. No.: WO02/091547

PCT Pub. Date: Nov. 14, 2002

(65) Prior Publication Data

US 2004/0155548 A1   Aug. 12, 2004

(30) Foreign Application Priority Data

May 8, 2001 (DK) ............................. 2001 00724
Dec. 11, 2001 (DK) ............................. 2001 01849

(51) Int. Cl.
*H02K 19/06* (2006.01)
*H02K 1/14* (2006.01)

(52) U.S. Cl. .................. 310/168; 310/216; 310/254

(58) Field of Classification Search .......... 310/49 R, 310/166–168, 216, 254, 259, 261
See application file for complete search history.

(56) References Cited

U.S. PATENT DOCUMENTS 3,171,049 A * 2/1965 Jarret et al. ................. 310/168

(Continued)

FOREIGN PATENT DOCUMENTS

DE  19956367  *  7/2001

(Continued)

OTHER PUBLICATIONS

Cheng-Tsung Liu; Kun-Shian Su; Jyh-Wei Chen "On the bogie and track material selections of a transverse flux linear switched-reluctance machine" Magnetics Conference, 1999. Digest of INTERMAG 99. 1999 IEEE International May 18-21, 1999 pp. DQ09-DQ09.*

(Continued)

*Primary Examiner*—Burton Mullins
(74) *Attorney, Agent, or Firm*—Harness, Dickey & Pierce, P.L.C.

(57) ABSTRACT

In order to improve the torque per weight ratio in electrical machines for a lower price it is proposed to use a segmented stator design. The segmented stator design is based on general E shaped cores traditionally used for single-phased transformers and inductors, The E-cores has a coil around the centered leg and is assembled parallel to the rotor axis, which means it will function with the transverse flux principle. A radial flux principle can also be performed with the E-cores if the E-cores are divided into two U-sections with a full pitch winding in between them. A clear extra advantage with the E-cores is short flux paths meaning less steel has to be magnetised. For a low volume production standard E-cores can be used making the investment in production facilities smaller. The E-core machines using the transverse principle can have different pole-shapes such the normal force between the rotor and stator are significantly reduced. This makes unequal designs like a 3 stator- and 2 rotor-pole design practical possible.

5 Claims, 8 Drawing Sheets

U.S. PATENT DOCUMENTS

| | | | |
|---|---|---|---|
| 3,174,064 A * | 3/1965 | Muller | 310/77 |
| 3,509,390 A * | 4/1970 | Rachwal et al. | 310/15 |
| 3,825,782 A * | 7/1974 | Dassler | 310/168 |
| 4,672,247 A * | 6/1987 | Madsen et al. | 310/49 R |
| 4,682,067 A * | 7/1987 | Oudet | 310/156.35 |
| 4,748,362 A | 5/1988 | Hedlund | 310/168 |
| 4,837,474 A * | 6/1989 | Petersen et al. | 310/254 |
| 4,857,782 A * | 8/1989 | Tokio et al. | 310/12 |
| 4,970,421 A * | 11/1990 | Kritzinger | 310/49 R |
| 5,015,903 A * | 5/1991 | Hancock et al. | 310/168 |
| 5,365,137 A * | 11/1994 | Richardson et al. | 310/258 |
| 5,543,674 A * | 8/1996 | Koehler | 310/164 |
| 5,633,551 A * | 5/1997 | Weh | 310/266 |
| 5,666,014 A * | 9/1997 | Chen | 310/90.5 |
| 5,844,346 A * | 12/1998 | Kolomeitsev et al. | 310/254 |
| 5,854,521 A | 12/1998 | Nolle | 320/12 |
| 6,960,862 B2 * | 11/2005 | Hill | 310/217 |

FOREIGN PATENT DOCUMENTS

| | | |
|---|---|---|
| JP | 60 144122 | 7/1985 |
| JP | 60227163 | 11/1985 |
| JP | 02290005 | 11/1990 |
| WO | WO 99/01924 | 1/1999 |

OTHER PUBLICATIONS

Cheng-Tsung Liu; Kuen-Shvang Su; "Three-dimensional Field And Side-force Design Analyses Of A Transverse Flux Linear Switched-reluctance Machine" MMM-Intermag Conference, 1998. Abstracts., The 7th Joint Jan. 6-9, 1998 pp. 343-343.*

R.Krishnan "Switched Reluctance Motor Drives: Modeling, Simulation, Analysis, Design, and Applications" 2001 Chap. 1, pp. 18-19.*

* cited by examiner

TRANSVERSE FLUX MACHINE WITH STATOR MADE OF E-SHAPED LAMINATES

FIELD OF THE INVENTION

The present invention relates to an electric rotating machine comprising a stator having a magnetic system comprising a plurality of individual core segments. In particular, the present invention relates to such a machine where the magnetic flux in the magnetic system is generated by windings arranged within outer legs of the core segments.

BACKGROUND OF THE INVENTION

An objective in the area of electrical machines in general is to make them more effective, such that they produce more torque with less weight and lower cost. Two electrical machine types have been in focus to full-fill this goal. These machines are the Permanent Magnet Transverse Flux Machine (PMTFM), and the switched reluctance machine (SRM). The PMTFM is well known for its high torque per weight ratio, but it is quite expensive and very difficult to manufacture because many parts are required. The SRM is one of the cheapest machines to manufacture and also has a reasonably good torque per weight density. Although the SRM has some good characteristics, it is not widely used mainly because of the high investment required to develop machines for an application and the high volume production and sales needed to lower the per unit cost of this development.

Figure 1:
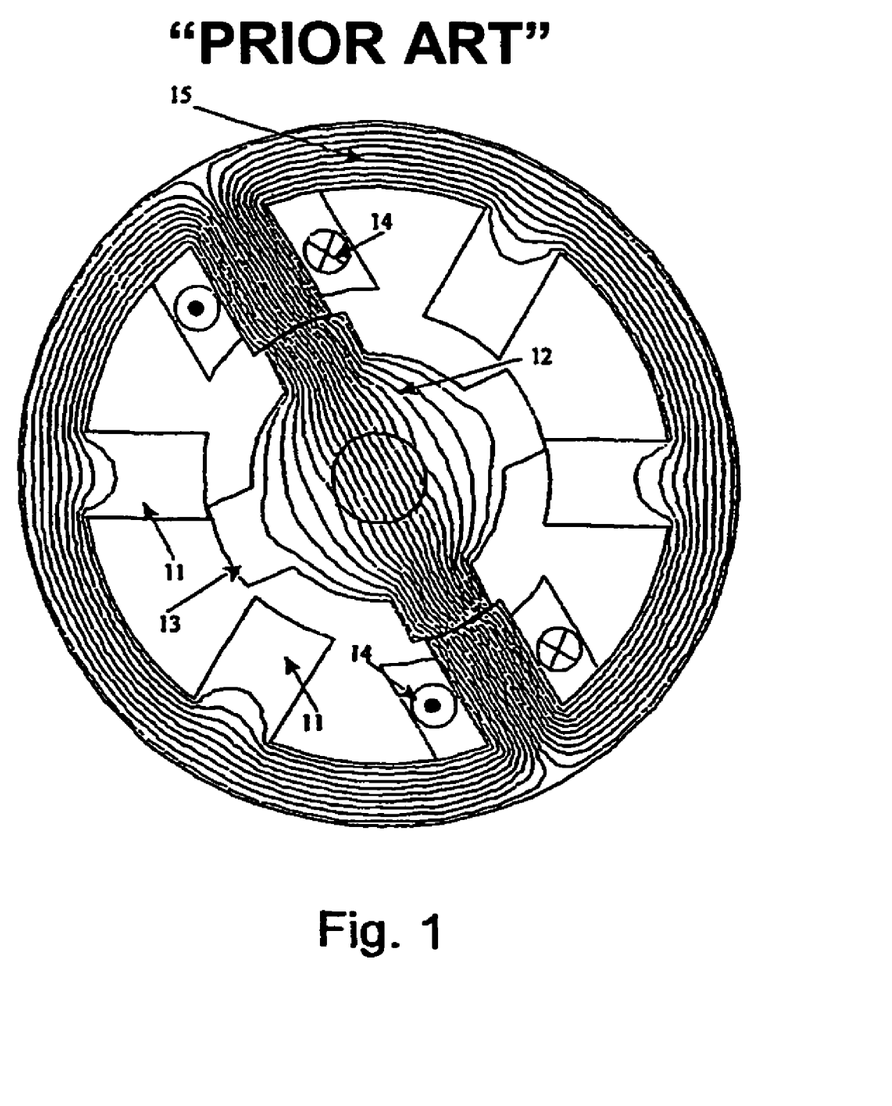
FIG. 1 shows a classical three-phase SRM with six stator-poles and four rotor-poles.

Electrical machines have traditionally been constructed by making a two dimensional cross-section in the X-Y plane and then extruding it in the axial dimension (z-axis) with a given number of non-oriented steel sheets. Such a two dimensional cross-section is shown in FIG. 1. The machine shown in FIG. 1 is a three-phase SRM with six stator poles 11 and four rotor poles 13. This machine has the disadvantage of long flux-paths in the stator yoke 15 from stator pole to stator pole and though the rotor yoke 12. The bobbin/needle wound coils 14 around the stator poles also present a disadvantage by extending past the steel stack thus making the machine longer. In addition, said coils are exposed and unprotected. With high magnetic saturation, which often is the case for an SRM, mutual couplings between the phases increases which makes exact control and design of the machine very difficult.

An alternative to the classical SRM in FIG. 1 is described in U.S. Pat. No. 5,543,674. This machine is made with U/C-cores and ring coils and as a disadvantage requires 3 stacks to make a three-phase machine. The machine is characterised by the transverse flux principle where the flux travels from pole to pole in the axial direction and not a radial direction (in the X-Y plane) as the classical machine in FIG. 1. Electrical machines utilising the transverse flux principle are primarily known for a high torque per volume density where the torque ideally increases linearly with the number of poles. Due to the fact that 3 stacks are needed, this machine requires many parts and is thus very complicated to manufacture.

U.S. Pat. No. 5,015,903 describes a switched reluctance machine with C/U-cores in the X-Y plane. The machine can be considered as a kind of alternative to the classical SRM where C/U cores are used. This machine has short flux-paths where only on a minor part of the stator yoke is magnetized during its operation. The machine uses two coils per C/U which require many parts. Also, the copper outside the C/U is not participating actively in torque production. Thus, the machine has the same disadvantages with many stacks and parts as the PMTFM, and the machine is therefore difficult to manufacture.

In U.S. Pat. No. 4,748,362 an SRM with bifurcated teeth is presented. This machine can be considered as a classical SRM with C/U cores at the end of the poles. This machine does not have a short short-flux path, but it is known for the similar properties as the transverse flux machines where the torque doubles due to the bifurcated teeth (dual teeth/poles). The machine has disadvantages of long-flux paths, small space for the coils and coils that are difficult to install.

It is an object of the present invention is to design an electrical machine, which solves the above-mentioned problem.

SUMMARY OF THE INVENTION

The above-mentioned object is complied with by providing, in a first aspect, an electric rotating machine comprising a stator and a rotor. The stator comprises a magnetic system for generating a magnetic flux. The magnetic system comprises a plurality of individual core segments. The core segments have a body and a plurality of legs arranged substantially perpendicular to, and in extension of, the body. The legs are separated from each other by air gaps, and the magnetic flux is generated by windings placed within outer legs of the core segments.

Thereby the windings will be shorter and concentrated inside the machine, which means no winding overhang like in the classical SRM. The outer sides on the two outer legs are not encircled by copper, which means the end-shields may be more simple to manufacture and assemble on the machine. Due to the fact that the poles and phases are separate no steel will be shared between the phases which makes the mutual couplings between phases small and thus exact control more simple.

In a specific embodiment the core segments are E-shaped, comprising a body and three legs, said wingding being winded around a middle leg of said three legs, thereby a combination of the advantageous features seen in the PMTFM and SRM are obtained by using E-cores, which is widely used for inductors and single-phase transformer. E-cores are manufactured in standard shapes and uses grain-oriented sheet steel which has a higher flux-density and has lower losses than non-oriented steel used for electrical machine in general.

In another embodiment the core segments are U-shaped. The U-shaped core segments comprises a body and two legs, the body of the U-shaped core segments is placed perpendicular to the rotor axis and windings are placed within the legs of the U-shaped core segments wound in an axis parallel to the rotor axis.

In a specific embodiment the body of said E-shaped core segments are placed in parallel to the rotor axis. In another specific embodiment the body of said E-shaped core segments are placed perpendicular to the rotor axis.

In an embodiment the endings of the legs are tilted increasing the gaps between the rotor and the endings of the legs. Thereby the air-gap flux is modified/optimised making the air-gap surface larger between the rotor yoke and the legs. This means less current is needed to magnetise the E-core and more torque can therefore be produced.

In a preferred embodiment the middle leg is wider than the two outer legs, preferably twice as wide. This has proven to be an advantageous embodiment.

BRIEF DESCRIPTION OF THE DRAWINGS

The present invention will now be explained in further detail with reference to the accompanying figures in which.

DETAILED DESCRIPTION OF THE INVENTION

The electrical machines described in the prior-art have disadvantages that the present invention removes by using standard E-cores. The present invention is described in the following.

Figure 2:
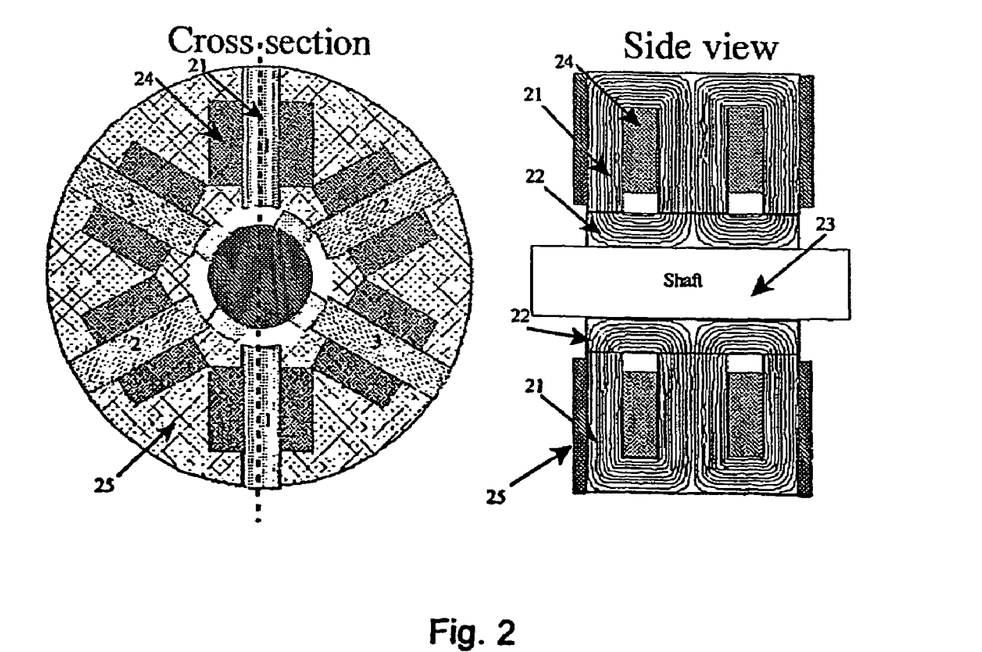
FIG. 2 illustrates an embodiment of an E-core transverse flux machine where the principle of using E-cores is adapted to the classical SRM.

FIG. 2 illustrates an embodiment of an E-core transverse flux machine where the principle of using E-cores is adapted on the classical SRM. E-cores are traditionally used for single-phase transformers or as rectifier inductors and are characterised by having the shape of the letter 'E' and being constructed from oriented sheet steel which results in a higher flux densities and lower losses. E-cores are also made and sold in standard geometric forms, which can be a large advantage when producing small quantities of the E-core transverse flux machine.

By using E-cores 21 and its yoke/rotor section 22 the flux-path is short when compared to the classical SRM as the steel in the stator-yoke and rotor-yoke is non-existent. The yoke/rotor section is mounted on the shaft 23. The coils 24 will be shorter and concentrated inside the machine, which means no winding overhang like in the classical SRM. The outer sides on the two outer legs are not encircled by copper, which means the end-shields 25 may be more simple to manufacture and assemble on the machine. Due to the fact that the poles and phases are separate no steel will be shared between the phases which makes the mutual couplings between phases small and thus exact control more simple. Classical SRM combinations of phases, stator and rotor poles may be applied on the E-core machine and the machine will still only have one stack. The machines described in U.S. Pat. No. 5,543,674 require the same amount of stacks as the number of phases and will thus be more difficult to manufacture. The machines in U.S. Pat. No. 5,543,674 will also need a large amount of parts.

Figure 3:
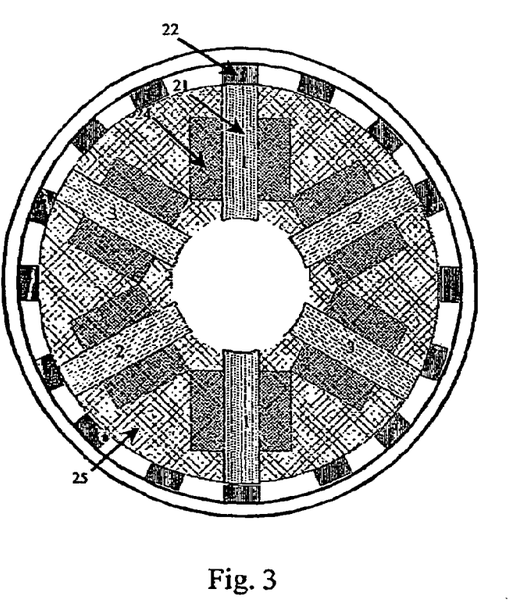
FIG. 3 illustrates an example of the E-core principle used on an electrical machine with an outer rotor.

As mentioned the E-core machine can be constructed with various combinations of phases and poles, but the machine also has additional advantages in an outer rotor design as shown in FIG. 3. The E-cores in the stator are simply flipped 180 degrees and additional rotor segments are used. The extra rotor/yoke segments do not add much to the total weight but there will be more attractions between the stator and rotor poles during each revolution. This will ideally improve the torque per mass density of the machine by a factor 4 when using 16 rotor segments, but in practice a factor in a range from 2-3 should be obtained.

Figure 4:
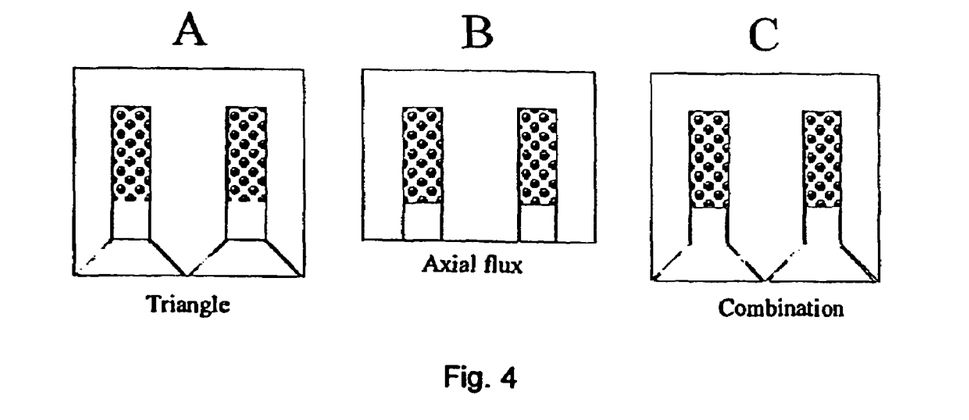
FIG. 4 shows examples of E-cores where the air-gap is modified or optimised.

The laminations used for E-core machine may differ from standard E-cores used for transformers and in FIG. 4 examples is shown where the air-gap flux is modified/optimised.

The example shown in FIG. 4-A is a triangle air-gap where the surface in the air-gap is larger. This means less current is needed to magnetise the E-core and more torque can therefore be produced. FIG. 4-B shows a principle where flux is crossing the rotor in the axial length which may reduce vibration and acoustic noise from the machine. Furthermore, some uneven stator/rotor pole combinations with this axial crossing flux may be more advantageous because there won't be an unequal pull on the rotor. An example of this arrangement could be an axial flux 3 phase E-core machine with 3 E-cores and two yoke/rotor segments. The air-gap shape in FIG. 4-C is simply a combination of FIG. 4-A and FIG. 4-B.

Figure 5:
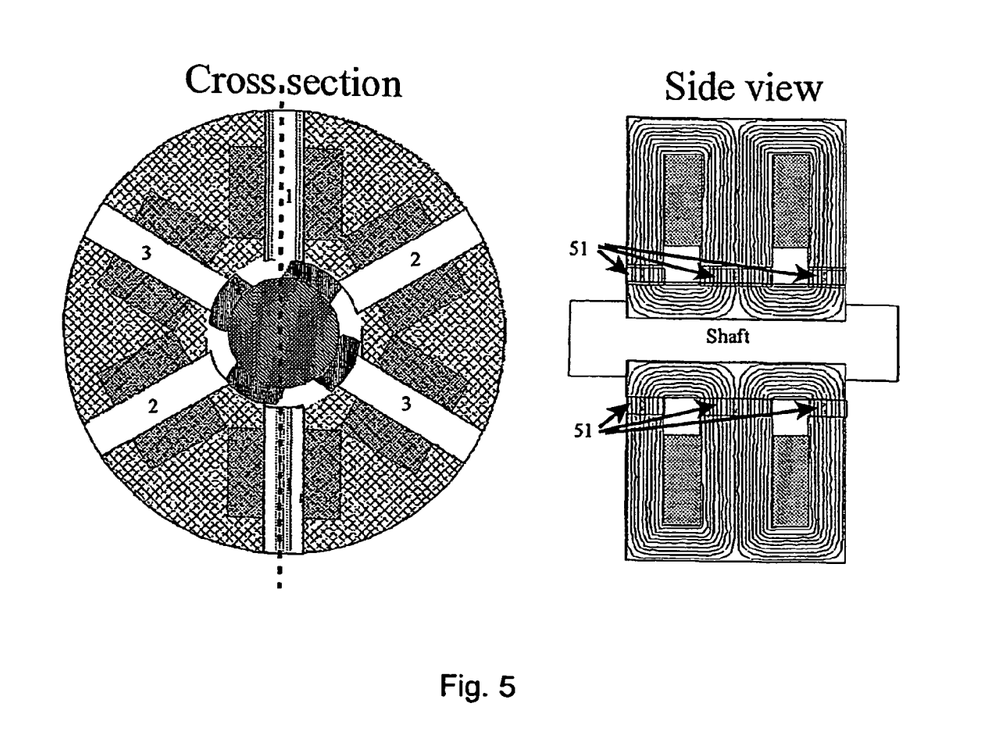
FIG. 5 shows an example of E-core principle together with permanent magnets on the rotor e.g. a permanent magnet E-core machine.

The E-core principle may also be used for other machine types such as a permanent magnet machine. In FIG. 5 an E-core permanent magnet machine is shown, where permanent magnets 51 are mounted on the rotor.

Figure 6:
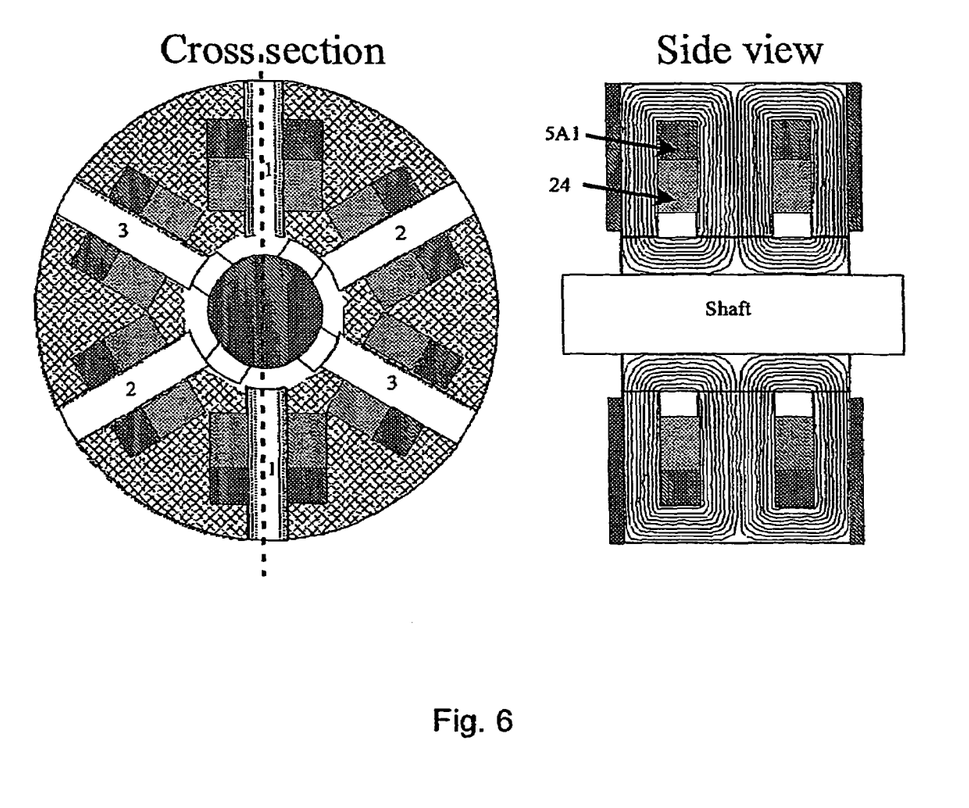
FIG. 6 shows an example of E-core principle with bias windings around the middle leg on the E-core.
Figure 7:
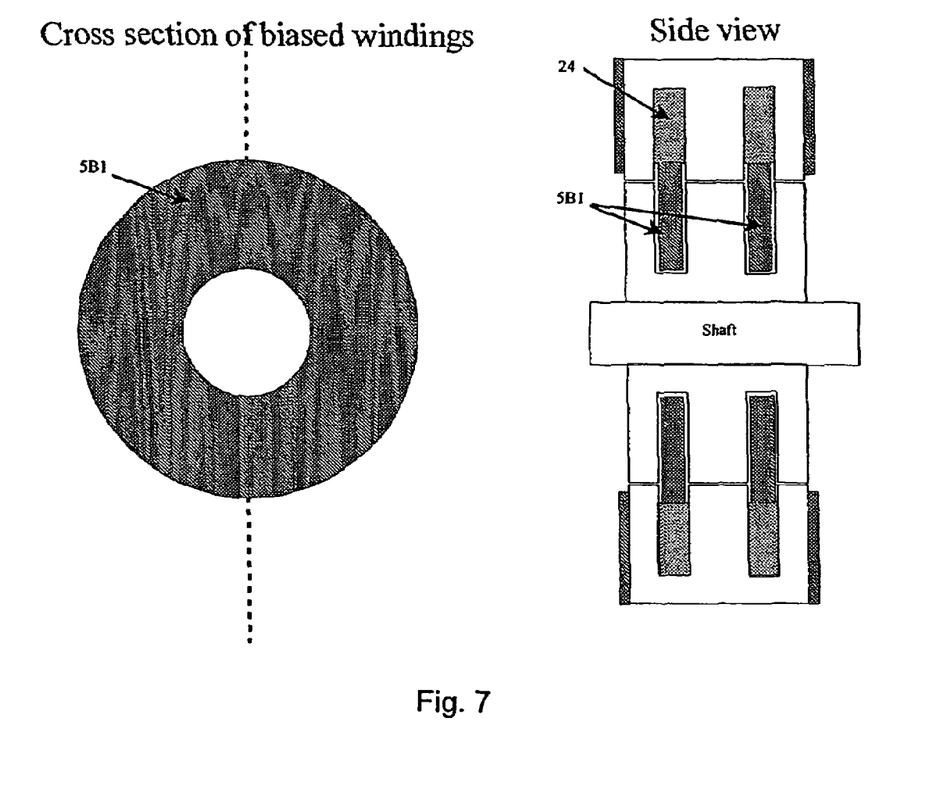
FIG. 7 shows an example of E-core principle with two donuts like biased windings and E-cores on both the rotor and stator side.

An extra field, like the machine with permanent magnets, can also be obtained with biased windings, where examples are shown in FIG. 6 and in FIG. 7. In FIG. 6, a biased winding 5A1 is added on the centred leg on all the E-cores. All the individual biased windings are then preferably coupled in series and connected to a DC voltage source. With help of the voltage amplitude or the DC current in the biased windings is it then possible to control the magnetisation in machine. This could be very advantageous if the machine is used as a generator who has to deliver the same voltages at different speeds. Another advantage is the fact that no brushes are required to the magnetisation circuit i.e. the DC biased windings. This is normally required for synchronous machines with variable magnetisation. With the biased assisted field is it also possible to supply the motor with a converter given bipolar currents. The biased windings can also be formed as two donut types shown in FIG. 7. The donut type windings 5B1 should be attached to the stationary part. To increase the winding area is it preferable to have double E-core poles.

It has to be mentioned that the coils can be wound around the two E-core outer legs, but it will not provide the same level performance as one coil on each E-core centre leg when equal amounts of windings are used.

Figure 8:
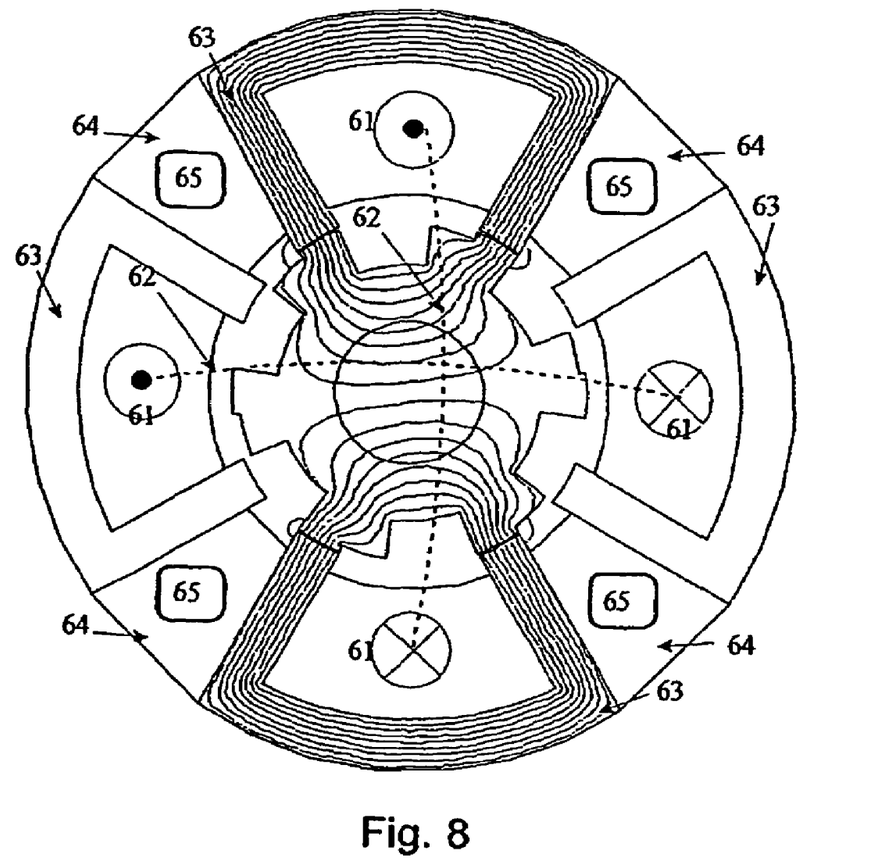
FIG. 8 shows an embodiment of a two-phase machine, with a divided E-core with a full-pitch winding around the divided centre leg.
Figure 9:
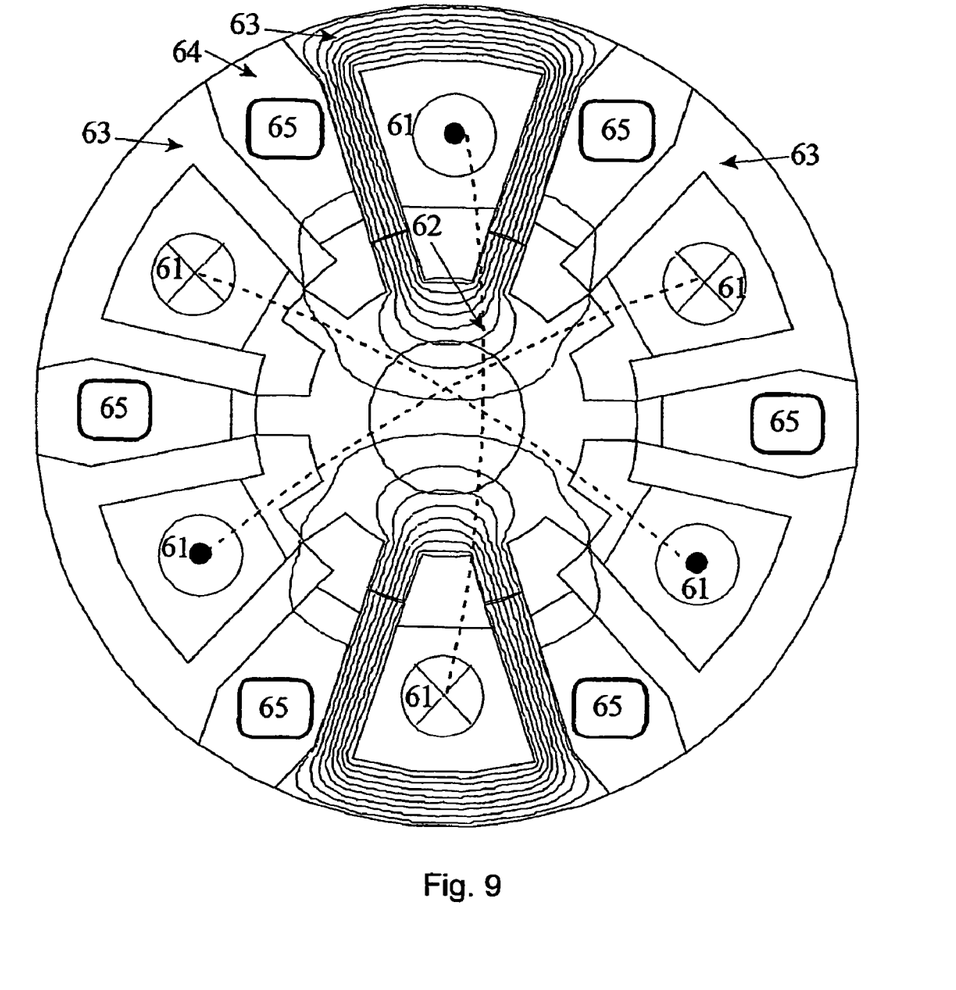
FIG. 9 shows an embodiment of a three-phase machine, with a divided E-core with a full-pitch winding around the divided centre leg.

The E-core idea with the coils around the centred leg can also be modified to the classical X-Y laminated machines. The E-Core is dived into two sections with a coil in the centre functioning as full pitch winding. In FIG. 8 and in FIG. 9 are examples of a two and three-phase versions shown. These machines can be considered as unique short flux-path machines having best features from U.S. Pat. Nos. 5,015,903, 4,748,362 and 5,545,938 combined in one single segmented machine. In U.S. Pat. No. 4,748,362 it was mentioned that bifurcated teeth gives a minimum number of coils, which was 4 for a two phase machine.

The elements on FIGS. 8 and 9 are full-pitch coils 61 having end-turns 62. Each of the coils makes a phase, but for a larger pole number is it possible to use more coils to perform a phase. The E-core is divided in stator segments 63. Between the stator segments preferably non-magnetic and dielectric material 64 may be used such the assembly is more simple. The non-magnetic material can be equipped with channels 65 such for instance water can pass though and cool the machines. But also auxiliary electrical wires may pass though in the channel.

With the modified E-core machine according to the present invention only two coils are required for a two-phase machine and a much larger slot area is available for the coils. The modified E-core machine has very large advantages in applications where the diameter is small in relation to the stack. In this case the copper in the end-turns has a minimum influence. Typical applications needing an electrical machine with a small diameter and long length are submersible pumps, servo machines, oil-well equipment etc. Similar to the E-core transversal flux machine the mutual couplings for this modified E-core machine is small.

Although the present invention has been described in connection with preferred embodiments, it is not intended to be limited to the specific form set forth herein. On the contrary, it is intended to cover such alternatives, modifications, and equivalents, as can be reasonably included within the spirit and scope of the invention as defined by the appended claims.

The invention claimed is:

1. A transverse flux switched reluctance type electric rotating machine for transforming at least one of mechanical power into electrical power and electrical power into mechanical power, the transverse flux switched reluctance type electric rotating machine comprising a stator and a rotor, said stator comprising a magnetic system for generating a magnetic flux, said magnetic system comprising a plurality of individual E-shaped core segments, each of said plurality of individual E-shaped core segments having a body and three legs being two outer legs and a middle leg, wherein the body of said E-shaped core segments is arranged substantially parallel to a rotor axis, wherein said three legs are arranged substantially perpendicular to, and in extension of, the body, and wherein said three legs are separated from each other by air gaps, said magnetic flux being generated by windings arranged around each of the middle legs, wherein the rotor includes poles of magnetically soft material arranged to conduct a magnetic flux generated by the magnetic system of the stator.

2. A transverse flux switched reluctance type electric rotating machine according to claim 1, wherein the rotor comprises a plurality of substantially I-shaped yokes of magnetically conductive material.

3. A transverse flux switched reluctance type electric rotating machine according to claim 1, wherein endings of the three legs are tilted thereby increasing a surface of the air gap surface between the rotor and the endings of the legs.

4. A transverse flux switched reluctance type electric rotating machine according to claim 1, further comprising one or more DC-biased windings arranged around the middle leg of the E-shaped core segments.

5. A transverse flux switched reluctance type electric rotating machine according to claim 1, further comprising at least one DC-biased donut windings arranged in each of said plurality of E-shaped core segments.

* * * * *